April 19, 1932.   R. H. DANEEL   1,855,101
MEANS FOR CONTROLLING AIR PRESSURE IN THE TIRES OF MOTOR VEHICLES
Filed Dec. 30, 1930   2 Sheets-Sheet 1
Fig. 1.
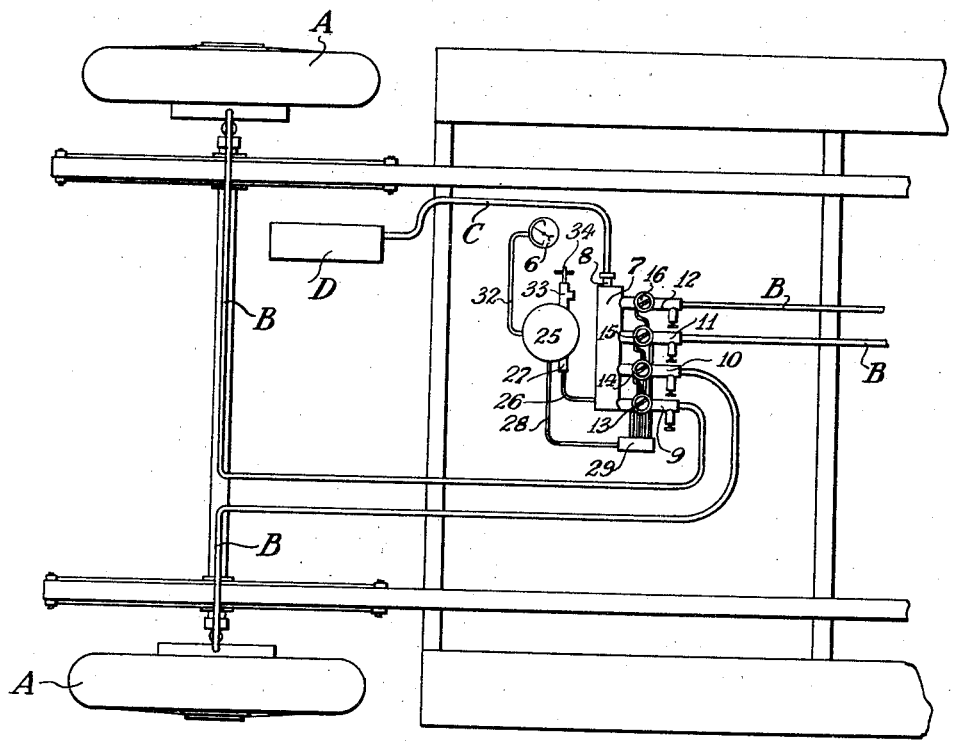
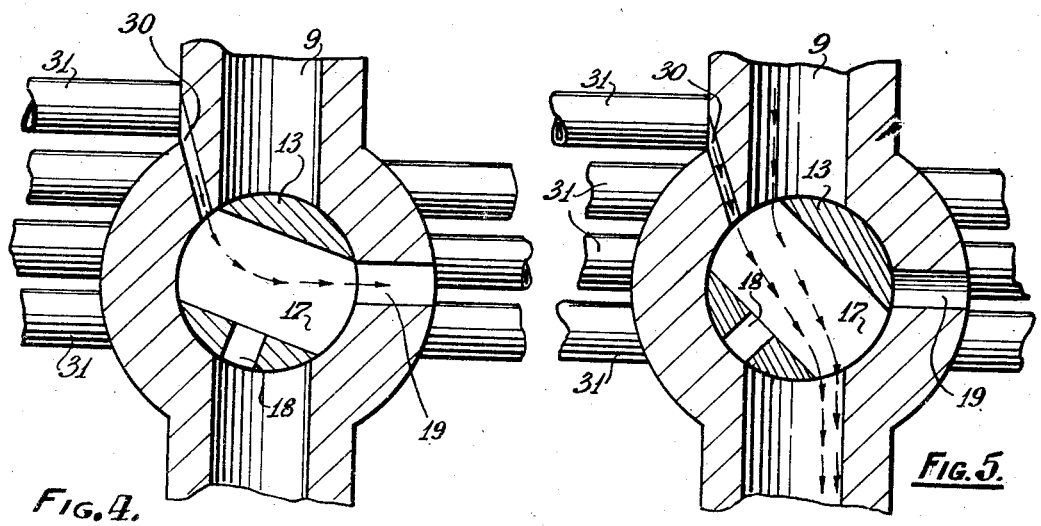
Fig. 4.   Fig. 5.
Richard Hurtley Daneel
Inventor April 19, 1932. R. H. DANEEL 1,855,101
MEANS FOR CONTROLLING AIR PRESSURE IN THE TIRES OF MOTOR VEHICLES
Filed Dec. 30, 1930 2 Sheets-Sheet 2

Patented Apr. 19, 1932

1,855,101

UNITED STATES PATENT OFFICE

RICHARD HURTLEY DANEEL, OF BRITSTOWN, UNION OF SOUTH AFRICA

MEANS FOR CONTROLLING AIR PRESSURE IN THE TIRES OF MOTOR VEHICLES

Application filed December 30, 1930, Serial No. 505,653, and in Great Britain January 15, 1930.

This invention relates to means for inflating pneumatic tires on the wheels of motor vehicles from a compressor on the car, either when the car is stationary, or to supply compressed air to one or more tires when running, in order either to inflate the tires or to prevent deflation of one or more tires when punctured.

The object of the present invention is to enable the amount of fluid pressure supplied to one tire singly or to two or more tires collectively to be gauged by a single indicating device.

If the indicating device were connected directly to pipes supplying air from a compressor to the tires it would be found difficult to read as the needle of the indicator would be violently vibrated by the impulses from the compressor. According to the invention therefore, the indicating device is connected to a stabilizing chamber, which is maintained at the same pressure as the tire which is being inflated, and which is connected to the manifold of a distributor through a non-return valve which will only allow liquid to pass from the distributor to the chamber and not in the reverse direction, and which is therefore not subject to violent changes in pressure such as may occur in the distributor.

Referring to the drawings,

Figure 1 illustrates diagrammatically in plan a fragment of a vehicle fitted with a distributor according to this invention;

Figure 2 showing the cocks in their open position, and Figure 3 showing the cocks in their closed position;

Figures 4 and 5 are fragmentary views illustrating one of the cocks on an enlarged scale in positions intermediate its open and closed positions.

Figure 2:
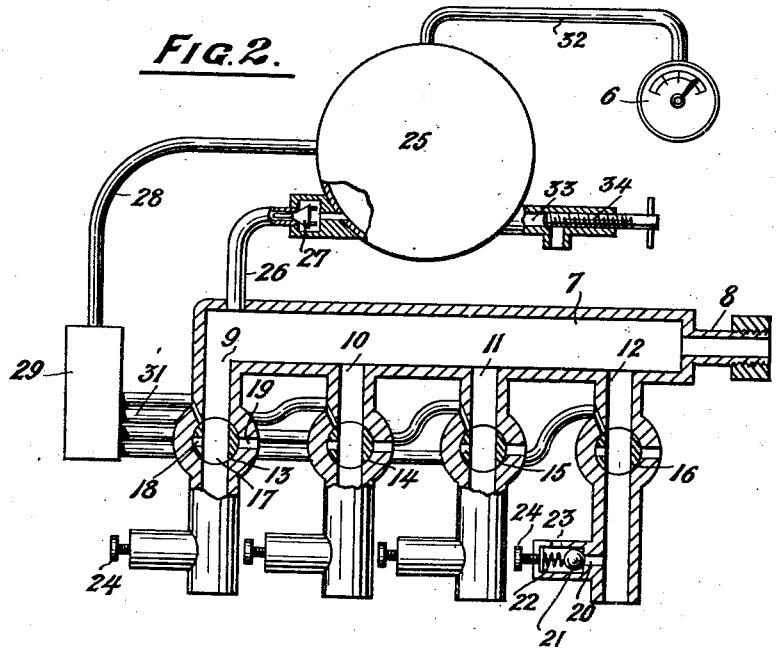
Figures 2 and 3 illustrates diagrammatically the parts of the distributor which are all arranged in the same plane to facilitate illustration.
Figure 3:
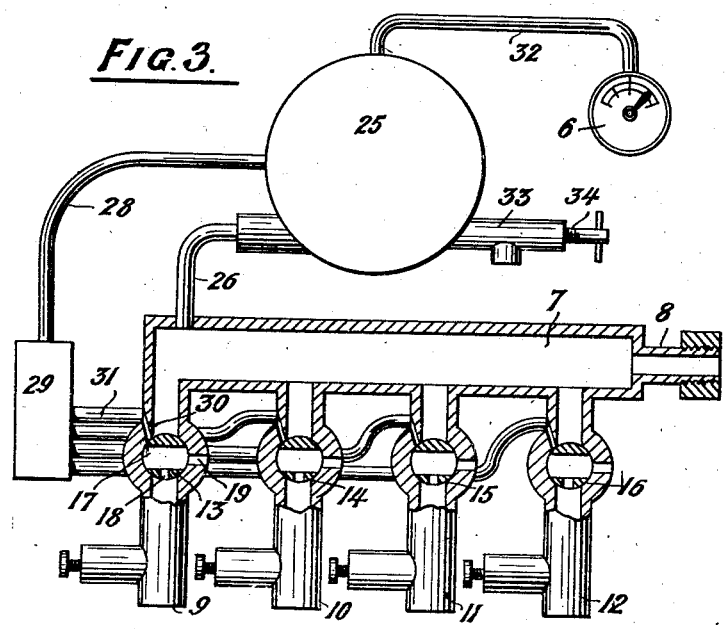

In the drawings the tires A are each connected by pipes B to the outlets 9, 10, 11 and 12 of a hollow rectangular casing 7 formed with an inlet 8 connected by a pipe C to a compressor D. The outlet pipes 9, 10, 11 and 12 are each provided with cocks 13, 14, 15 and 16. Each cock is provided with a main passage 17 and an auxiliary passage 18 so arranged that in one position of the cock, shown in Figure 2, the outlet communicates the casing 7 with the pipe B, and in the other position, shown in Fig. 3, the outlet from the casing is cut off and the outlet communicates the pipe B with a relief port 19 open to the atmosphere. A by-pass channel 20 (Fig. 2) opens off each of the outlet pipes to a blow-off valve 21 loaded by the spring 22, so as to relieve the outlet passage of air pressure which can pass away through the port 23 when the air pressure has reached a certain limit. An adjustment device 24 is provided for adjusting the pressure of the spring 22 and thus vary the limit at which the valve blows off.

The pipes B are connected to the tire through the tire valves which are so arranged as to have no spring resistance which must be overcome to admit the air supply, the valve being of a self-closing type which depends upon the air pressure in the tire to close the valve and maintain it closed when the pressure supplied by the distributor is cut off and atmospheric pressure is substituted.

The casing 7 is connected to a chamber 25 by the chamber inlet pipe 26 and non-return valve 27. This chamber is also provided with a chamber outlet pipe 28, a discharge distributing chamber 29 and further chamber outlet pipes 31, each of which further outlet pipes communicates with ports 30, controlled by the cocks 13, 14, 15 and 16. The ports 30 are so arranged that they are closed by the cocks when said cocks are in either of their terminal positions, but one of said ports 30 is opened momentarily during the turning of any one of the cocks from one terminal position into another terminal position, as shown in Figure 4. When the ports 30 are so opened, air from the chamber 25 passes through the chamber outlet pipe 28, discharge distributing chamber 29, one of the further outlet pipes 31, ports 30, the main passage 17 in the cock to the relief port 19, as shown by the arrows in Figure 4. The chamber 25 is also provided with a pipe 32 which communicates with a pressure gauge 6 and with a pressure release outlet 33 controlled by a valve 34.

In operation, when it is desired to inflate any one or more of the tires the cock in the outlet connecting to said tire is turned into its open position. In turning this cock it will first be moved into the position shown in Figure 4, so that due to leakage of air from the chamber 25 through pipes 28 and 31, discharge distributing chamber 29, ports 30, cock passages 17 and relief ports 19, the pressure in said chamber will be reduced. On the continued movement of the cock it will be brought into the position shown in Figure 5, in which the casing 7 is communicated through the outlet 9 with the pipe B so that the pressure in the casing 7 will drop to the minimum pressure attained on the inflation of the tire. Further, the port 30 is still open to the cock passage 17 and through this passage to the outlet 9 and this port remains so open until the cock approaches the end of its opening movement, so as to ensure reduction of the pressure in the chamber 25. When the cock is in its open position the said port 30 will be closed by the valve, and the pipe B and tire will be open to the casing 7. Air from the casing 7 will now flow through the pipe B into the tire and through the chamber inlet pipe 26 into the chamber 25. Due to the arrangement of the connections to the chamber 25 and to the tire, the air pressure in said chamber 25 will increase with that in the tire being inflated, so that the pressure gauge will indicate when the required pressure has been obtained, after which the cock will be closed. The blow-off valves 21 prevent the tire from being inflated above the desired pressure. This closing of the cock cuts off the flow of air to the tire and opens the pipe B to atmosphere, thus causing the air in the tire to maintain the tire valve closed.

When it is desired to prevent deflation of a tire which is punctured, the cock is opened as before to admit air to said tire. The valve 34 is also opened so as to allow a small amount of air in the chamber 25 to escape continuously. In this way, the pressure in the chamber is prevented by the escape of air from being maintained higher than the pressure of air passing into the tire, so that the air in the casing 7 will divide, a major portion passing to the tire and a minor portion to the chamber 25. The air pressure in the chamber 25 will therefore be the same as the air pressure in the tire and this pressure will be indicated by the pressure gauge 6.

It will be appreciated that the effect of the chamber (25) and the non-return valve (27) is to eliminate the effects of the impulses from the compressor, so that the pressure in the chamber (25) may be read off accurately on the gauge (6), the needle of which will not be subject to the vibration due to the compressor impulses.

In the case when the apparatus is being used to inflate a tire which is not punctured the tire is pumped up until the desired pressure is indicated on the gauge (6). The cock (13) is then turned from its operative position indicated in Figure 2 to its operative position indicated in Figure 3, which operation will, as explained above, place the chamber (25) in communication with the atmosphere through manifold (29) pipe (31) and ports (18) and (19). The needle of the gauge (6) will therefore return to zero and the stabilizing chamber (25) will be ready for measuring the pressure when the next tire is to be inflated.

When, however, the apparatus is to be used for enabling a vehicle to travel with a punctured tire the valve (34) is opened to give a leakage from the chamber (25) which will compensate for the leakage of air from the tire through the puncture thus stabilizing the indications of the gauge. As the pressure in the punctured tire is continually fluctuating due to air leakage through the puncture the gauge pointer would tend to remain at the blow off pressure to which the valve (21) is loaded if no provision were made for producing similar fluctuations in the pressure in the chamber (25). By allowing a small continuous leak of air through port (33) the gauge needle will rise and fall with the rise and fall of pressure in the tire thus giving a true record of the pressure in the tire.

Although the operation has for convenience been described with reference to the inflation or the prevention of the deflation of one tire only, two or more tires may be collectively inflated or prevented from deflation in a like manner.

I claim:

1. Apparatus for distributing compressed air to the tires of motor vehicles comprising in combination a compressor, a distributor, means for supplying compressed air from the compressor to the distributor, supply conduits for passing air from the distributor to the vehicle tires, cocks for controlling the supply of compressed air through each conduit, means for reducing the pressure in each conduit to atmospheric pressure on interruption by the appropriate cock of the supply of compressed air through that conduit, a chamber, an inlet passage interconnecting the chamber and the distributor, a non-return valve located in said inlet passage and adapted to allow air to pass from the distributor to the chamber while preventing the return of air from the chamber to the distributor, outlet passages from the chamber, ports associated with said outlet passages and cooperating with said cocks, the ports being adapted on operation of their appropriate cocks to place said chamber into communication with the atmosphere, and a pressure gauge for indicating the pressure in said chamber.

2. Apparatus for distributing compressed air to the tires of motor vehicles comprising in combination a compressor, a distributor, means for supplying compressed air from the compressor to the distributor, supply conduits for passing air from the distributor to the vehicle tires, a blow off valve in each conduit for limiting the pressure of air supplied to the tires, cocks for controlling the supply of compressed air through each conduit, a relief port controlled by each cock and adapted to reduce the pressure in its appropriate conduit to atmospheric pressure on actuation of the cock to interrupt the supply of compressed air through that conduit, a chamber, an inlet passage interconnecting the chamber and the distributor, a non-return valve located in said inlet passage and adapted to allow air to pass from the distributor to the chamber while preventing the return of air from the chamber to the distributor, outlet passages from the chamber, ports associated with said outlet passages and co-operating with said cocks, the ports being adapted on operation of their appropriate cocks to place said chamber into communication with the atmosphere, and a pressure gauge for indicating the pressure in said chamber.

3. Apparatus for distributing compressed air to the tires of motor vehicles comprising in combination a compressor, a distributor, means for supplying compressed air from the compressor to the distributor, supply conduits for passing air from the distributor to the vehicle tires, a blow off valve in each conduit for limiting the pressure of air supply to the tires, a cock associated with each conduit for controlling the supply of air thereto and having a port arranged to co-operate with a relief port in the conduit to put the latter into communication with atmosphere on operation of the cock to interrupt the supply of air through the conduit, a chamber, a valve-controlled pressure relief outlet in said chamber, an inlet passage interconnecting the chamber and the distributor, a non-return valve located in said inlet passage, and adapted to allow air to pass from the distributor to the chamber while preventing the return of air from the chamber to the distributor, outlet passages from the chamber, ports associated with said outlet passages and co-operating with said cocks, the ports being adapted on operation of their appropriate cocks to place said chamber into communication with the atmosphere, and a pressure gauge for indicating the pressure in said chamber.

4. Apparatus for distributing compressed air to the tires of motor vehicles comprising in combination a compressor, a distributor, means for supplying compressed air from the compressor to the distributor, supply conduits for passing air from the distributor to the vehicle tries, cocks for controlling the supply of compressed air through each conduit, means for reducing the pressure in each conduit to atmospheric pressure on interruption by the appropriate cock of the supply of compressed air through that conduit, a chamber, an inlet passage interconnecting the chamber and the distributor, a non-return valve located in said inlet passage and adapted to allow air to pass from the distributor to the chamber while preventing the return of air from the chamber to the distributor, outlet passages from the chamber, ports associated with said outlet passages and arranged on interruption of the supply of air to the tires to place the chamber in communication with the atmosphere, and a pressure gauge for determining the air pressure in the chamber.

In witness whereof I have hereunto set my hand.

RICHARD HURTLEY DANEEL.